July 19, 1960 P. F. MAEDER 2,945,692

MEANS FOR PROVIDING INTIMATE CONTACT BETWEEN A SURFACE AND TAPE IN TAPE RECORDER DEVICES AND THE LIKE

Filed Aug. 16, 1957 5 Sheets-Sheet 1

INVENTOR:
PAUL FRITZ MAEDER
BY
Dike, Thompson & Bronstein
ATTORNEYS.

July 19, 1960 P. F. MAEDER 2,945,692

MEANS FOR PROVIDING INTIMATE CONTACT BETWEEN A SURFACE AND TAPE IN TAPE RECORDER DEVICES AND THE LIKE

Filed Aug. 16, 1957 5 Sheets-Sheet 2

INVENTOR:
PAUL FRITZ MAEDER
BY
Wike, Thompson & Bronstein
ATTORNEYS:

INVENTOR:
PAUL FRITZ MAEDER
BY
Dike, Thompson & Bronstein
ATTORNEYS.

INVENTOR:
PAUL FRITZ MAEDER
BY
Dike, Thompson & Bronstein
ATTORNEYS.

MEANS FOR PROVIDING INTIMATE CONTACT BETWEEN A SURFACE AND TAPE IN TAPE RECORDER DEVICES AND THE LIKE

Filed Aug. 16, 1957 5 Sheets-Sheet 5

INVENTOR:
PAUL FRITZ MAEDER
BY
Dike, Thompson & Bronstein
ATTORNEYS.

2,945,692

MEANS FOR PROVIDING INTIMATE CONTACT BETWEEN A SURFACE AND TAPE IN TAPE RECORDER DEVICES AND THE LIKE

Paul F. Maeder, Rumford, R.I., assignor to Speidel Corporation, Providence, R.I., a corporation of Rhode Island Filed Aug. 16, 1957, Ser. No. 678,732

14 Claims. (Cl. 271—2.3)

The present invention relates to a recording device for recording, playing back and/or reproducing intelligence by means of a tape.

In copending application, Serial No. 678,503, filed this day by Dr. Paul Fritz Maeder, there is described an improved device of this type in which the tape and drive mechanism are immersed in a liquid, preferably having a specific gravity equal or reasonably close to the specific gravity of the tape.

It has been found that with the use of this liquid conventional driving mechanism will not satisfactorily drive the tape.

It has been found that if means are provided on a surface of the drive mechanism for providing sufficient traction between the tape surface and the surface of the drive mechanism this difficulty can be overcome.

The same mechanism for doing this can also be used to provide intimate contact between the surface of the tape and any other surface with which the tape must come into intimate contact because it is effective to remove fluid from between such surfaces and it is this fluid which prevents the required intimate contact. This is true not only in the case of liquids but also in the case of fluids of all types including gases. For example, when the tape is driven approximately 51 times faster in air than in water the same detrimental effect takes place due to the layer of air trapped between the two surfaces at this high speed. Not only is this problem present in the drive mechanism but it also may arise where intimate contact is required between the tape and any surface in the recording unit as for example between the tape and the gap surface of a head.

A particular and preferred way of providing this traction and removing the fluid comprises making the surface of the drive mechanism, in the case of the copending application the drive capstan, flexible and resilient by the use of a rubbery material and providing therein a slit, preferably a plurality of slits, extending in a direction at an angle to the longitudinal center line of the tape. When the tape is pressed against this flexible rotating surface it (the surface) is deformed into a sawtooth-like shape which provides the required traction by removing the layer of fluid from the surface of the tape so that intimate contact is provided between the tape surface and the rubbery surface.

Another way of doing the same thing is to make the periphery of the capstan rigid and provide it (the periphery) with a plurality of sawtooth-like serrations extending in a direction at an angle to the longitudinal center line of the tape.

The invention will be more fully understood by referring to the accompanying drawings in which corresponding elements of different views are designated by like reference characters and in which a specific embodiment of the invention is shown.

Figure 6:
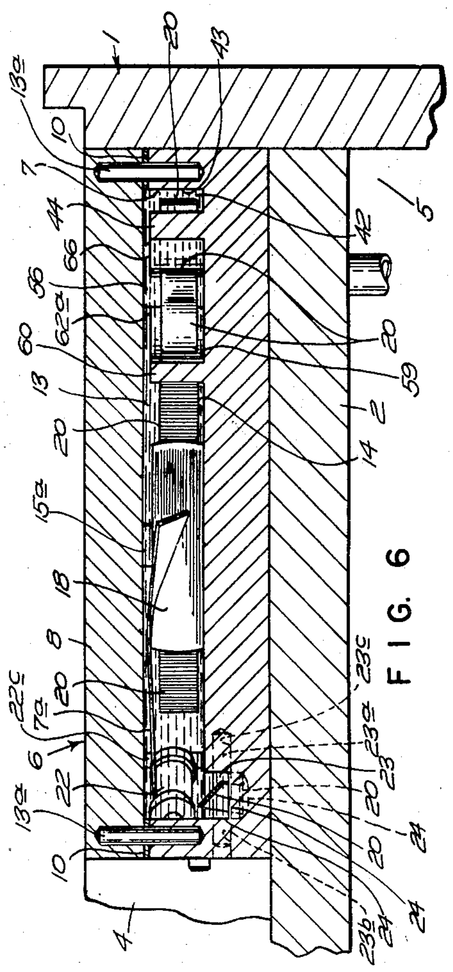
Fig. 6 is a section taken on the line 6—6 of Fig. 1 showing the cavity full of liquid, the cover in place and a part of the supporting structure.

With reference to the drawings, 1 represents a frame or support having a dividing platform 2 dividing the interior of the support into a top space 4 and a bottom space 5. Cartridge 6, containing a recorder and playback mechanism, is detachably attached to the top of platform 2 by means of screws (not shown). The cartridge is in the form of a plate made up of two pieces **6*a* and 6*b* joined together in a liquid-tight manner by threaded bolts 6*c* (see Fig. 3). The plate has a cavity 7 in the top thereof. Cover 8 closes the top of the cavity in a liquid-proof manner and is attached to the top of the plate by means of a sealing gasket 10 and screws 12 passing through apertures 12*c* in the cover and 12*a* in the gasket into threaded apertures 12*b* in the plate (see Fig. 3). Guide pins 13*a* (Figs. 1, 2 and 6) cooperate with matching recesses 13*b* in the plate, gasket and cover to aid in placing and maintaining the cover in correct position. The sealed cavity 7 is filled with a liquid 7*a*. The cavity 7 and cover 8 form a sealed chamber 13 which is filled with liquid 7*a*** and which is liquid-proof.

Rotatably mounted in cavity 7 by means of bronze bushings 15 and **15*a* (see Figs. 1, 2 and 3) and pins 17 and 17*a* extending upwardly from the floor 14 of the cavity are a pair of reels or spools 16 and 18 respectively, the bottom portion of each of which is received in a circular recess, 19 in the case of reel 16 and 19*a* in the case of reel 18, in the floor 14. The peripheries of reels 16 and 18** are convex (see Fig. 3) to centralize the tape vertically on the reels and aid in transport of the tape.

A multi-layer, spirally wound coil of tape 20 is arranged or stored around the reels 16 and 18 as shown.

The tape 20 is transported or pulled inwardly and upwardly from the inner coil or layer partially around the periphery of reel 16 (see Figs. 1, 6, 7 and 11) over the top of reel 18 and the upper edge of the coil of tape 20, over guide roll 22 and under guide roll 23, both guide rolls being rotatably mounted on horizontal pins **22*a* and 23*a* respectively which are in turn mounted in a corner of the cavity. Pin 22***a* is so mounted by means of a pair of apertures 22*b* in the adjacent walls of the cavity forming the corner. Recesses 22*c* are provided in the adjacent walls of the cavity to accommodate the ends of roll 22. The tape contacting portion of the periphery of roll 22 is recessed at 22*d*. Top roll 22 changes the attitude of the tape from vertical to horizontal and lower horizontal roll 23 changes the direction of movement of the tape as shown. The top of the tape contacting periphery of top roll 22 is located slightly above the top of the coil 20 (see Figs. 5, 7 and 11) to permit the tape to clear the top of spool 18 and the top of coil 20. Although in the drawings the top of the tape contacting periphery of roll 22 is slightly below the portion of the top of reel 18 over which the tape is pulled, friction can be reduced somewhat by locating roll 22 so that the top of the tape contacting periphery thereof is slightly above this portion of roll 18 as well as the top of coil 20.

A groove 24 (see Figs. 1, 2, 6, 7) is milled in an edge of the floor 14 of the cavity 7 and extends from under the lower roll 23 toward guide roll 26. It becomes shallower as it approaches the roll 26 so that the floor thereof forms a ramp. One wall of the groove lies in the same plane as well 26*a* (see Fig. 2) of the cavity and forms a continuous wall therewith. Roll 23 is located in the deepest end of the groove and is mounted therein by means of apertures 23*b* (see Figs. 1, 2, 5 and 6) in the opposite sides of the groove and into which the ends of pin 23*a* extend. This groove provides clearance for the tape as it emerges from under the bottom roll 23 in a horizontal attitude.

Figures 7, 10, 11, 13:
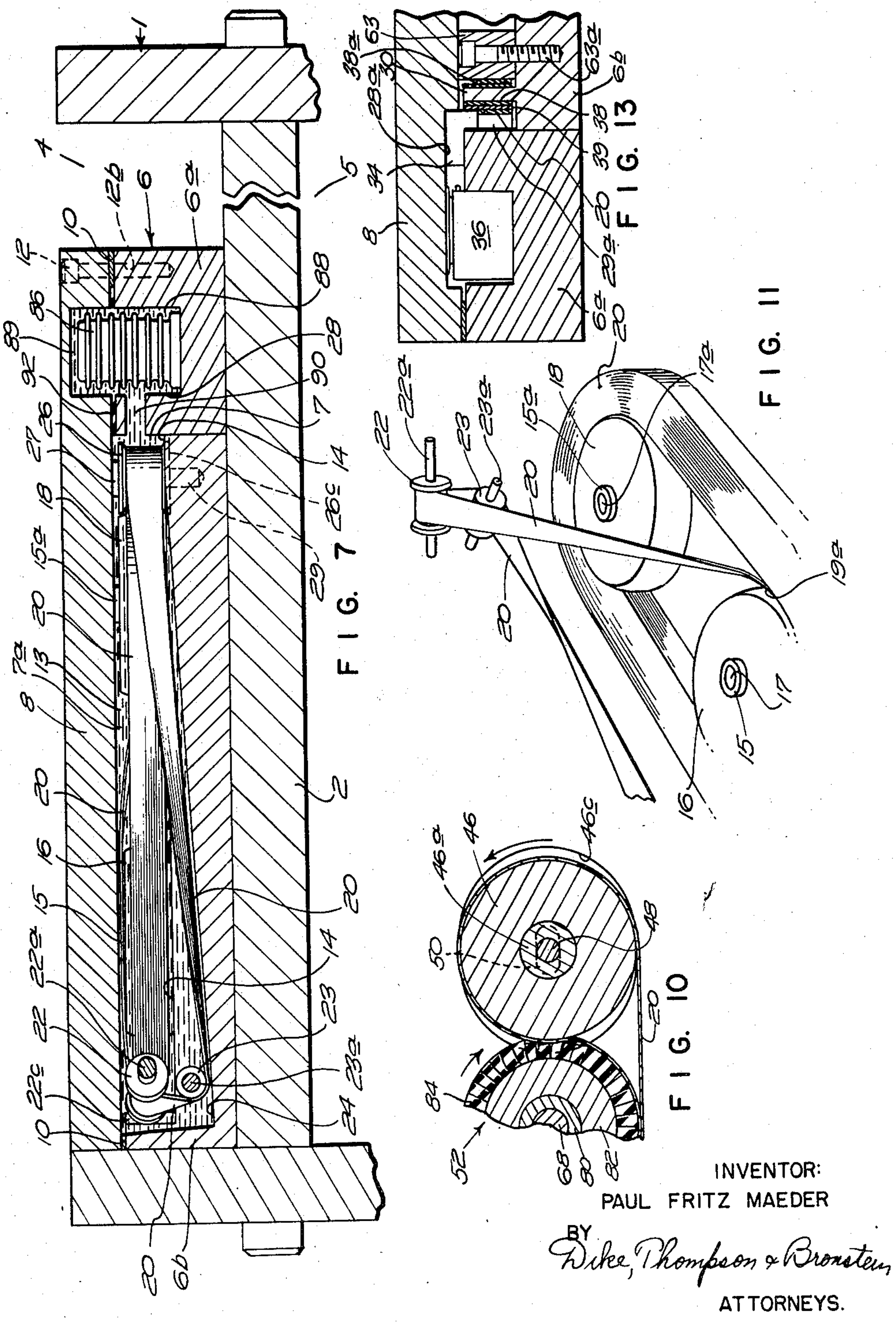
Fig. 7 is a section taken on the line 7—7 of Fig. 1 showing the cavity full of liquid, the cover in place and the supporting structure.
Fig. 10 is an enlarged section of the drive capstan and the tension guide roll in tape driving position with respect to the tape and capstan.
Fig. 11 is a view in perspective of a part of the coil of tape and the guide mechanism for pulling the tape from the inside of the coil.
Fig. 13 is a view taken along the line 13—13 of Fig. 1.

The tape is pulled from under roll 23 through groove 24 and around the periphery of guide roll 26 which is made of nylon and which is rotatably mounted in the cavity by means of bronze bushing 27 and a pin 29 extending upwardly from floor 14 of the cavity. The tape contacting surface of the roll 26 is recessed at 26*b* in order to hold the tape in place. Since the guide roll 26 is mounted on vertical pin 29 it changes the attitude of the tape from horizontal back to vertical. The bottom of roll 26 is received in recess 26*c* in floor 14 as shown in Figs. 2 and 7.

From guide roll 26, the tape 20 is pulled through a guide trough 29*a* (see Figs. 1, 2) formed by the wall 28 of the cavity 7 and a stationary guide bar 30 rising from the floor 14 of the cavity. Wall 28 comprises an edge of portion 6*a* of the cartridge plate 6, as shown. In passing through this trough the tape 20 passes in front of the playback head 32, the erasing head 34 and recording head 36, which are mounted in recesses in the top of portion 6*a* of the cartridge with their gap faces protruding slightly from the wall 28. The tops of the heads extend slightly above the top surface of plate 6*a* and are received in a complementary recess 28*a* (see Fig. 1) in cover 8. The tape passes in front of these gap surfaces and is pressed firmly thereagainst by means of a leaf spring 38 biased by bar 30 against a felt pressure pad 39 which is glued to spring 38 and which in turn presses the tape against the gap surfaces of the three heads.

Figure 1:
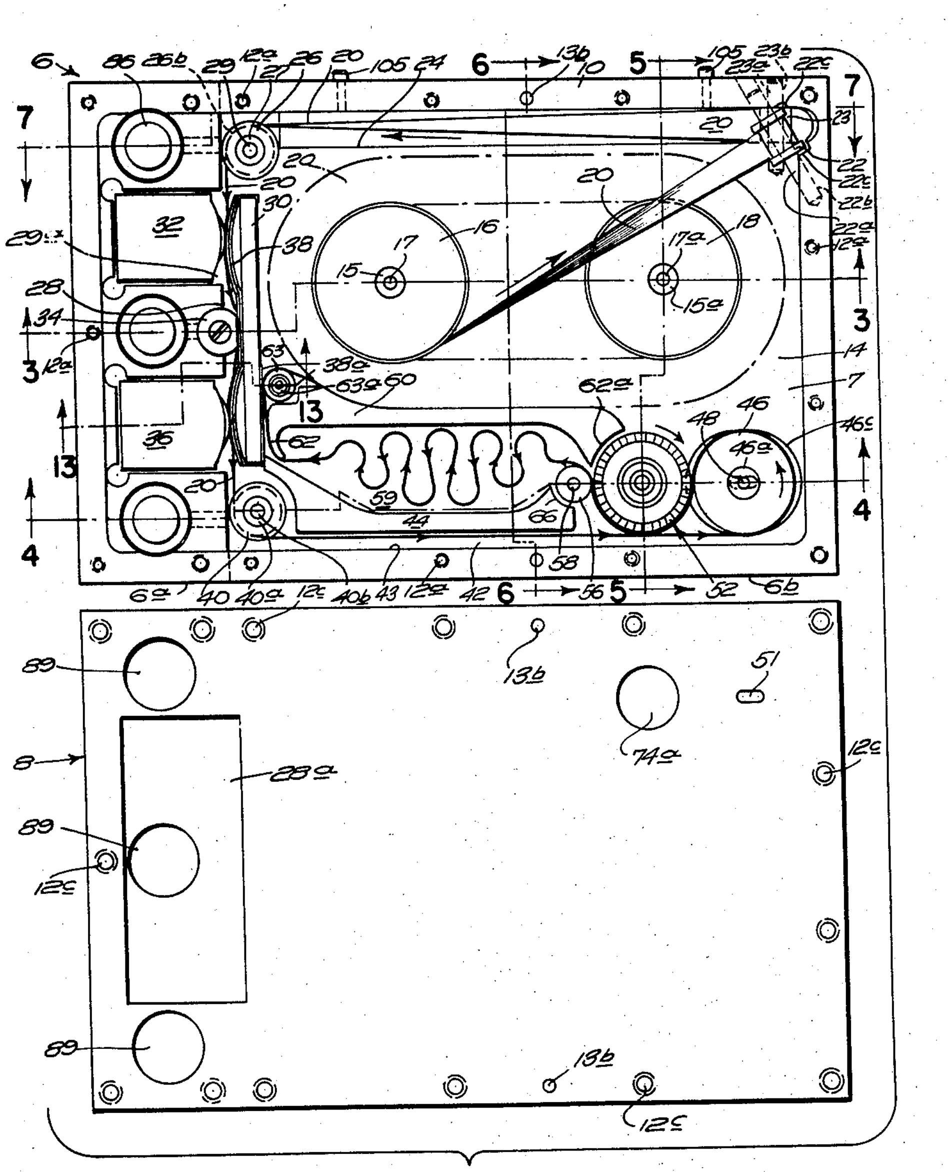
Fig. 1 is a plan view of a tape recorder embodying the present invention with the cover and the liquid removed and the cover rotated 180 degrees about its longitudinal axis to show the bottom thereof.
Figures 2, 8, 9:
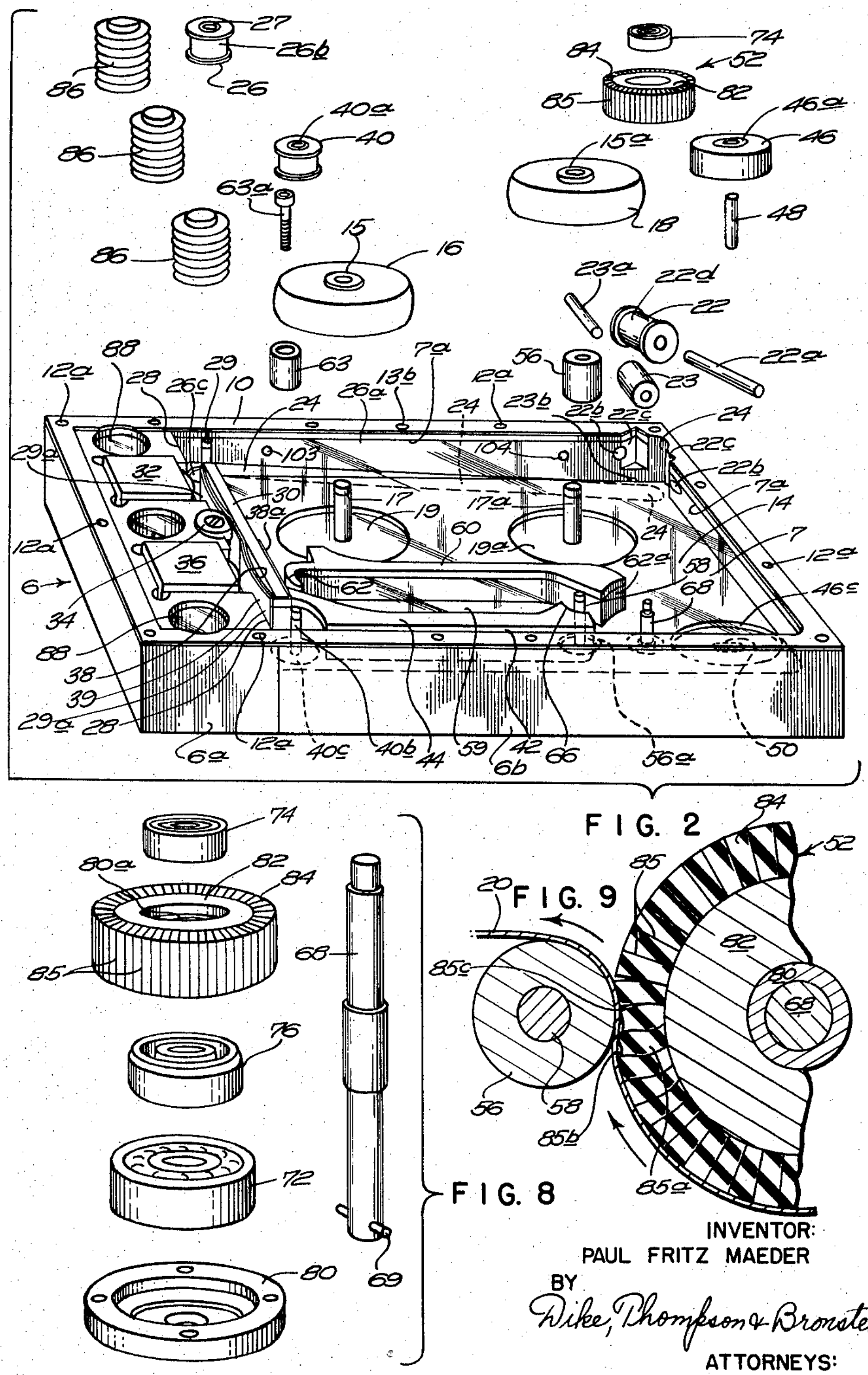
Fig. 2 is an exploded view in perspective of the recorder of Fig. 1 with the tape removed.
Fig. 8 is an exploded view in perspective of the drive capstan.
Fig. 9 is an enlarged section of the drive capstan, a guide roll which cooperates therewith and the tape passing therebetween during operation of the recorder.
Figure 3:
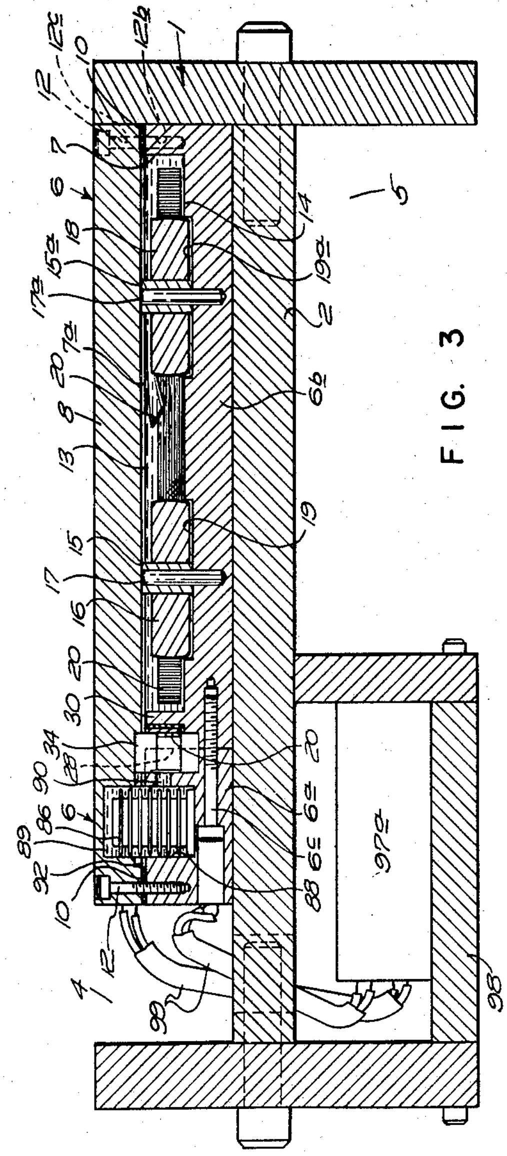
Fig. 3 is a section taken on line 3—3 of Fig. 1 showing the cavity full of liquid, the cover in place and the supporting structure on which the recorder is supported.

The free ends of the spring 38 extend around the ends of bar 30, as shown in Figs. 1 and 2, with one end 38*a* thereof extending some distance along the rear face of the bar.

From trough 29*a* the tape is pulled or guided around the periphery of guide roll 40 (see Figs. 1, 2 and 4) which is similar in construction to guide roll 26 and which is made of nylon and is rotatably mounted by means of bronze bushing 40*a* on a pin 40*b* extending upwardly from the floor 14 of the cavity. The periphery of the roll 40 is recessed like 26 and the bottom portion thereof is received in a recess 40*c* in the floor 14.

From roll 40 the tape is pulled through a second guide trough 42 (see Figs. 1, 2 and 6) formed by a wall 43 of the cavity and a stationary guide member 44 rigidly mounted on the floor of the cavity as shown.

Figures 4, 5:
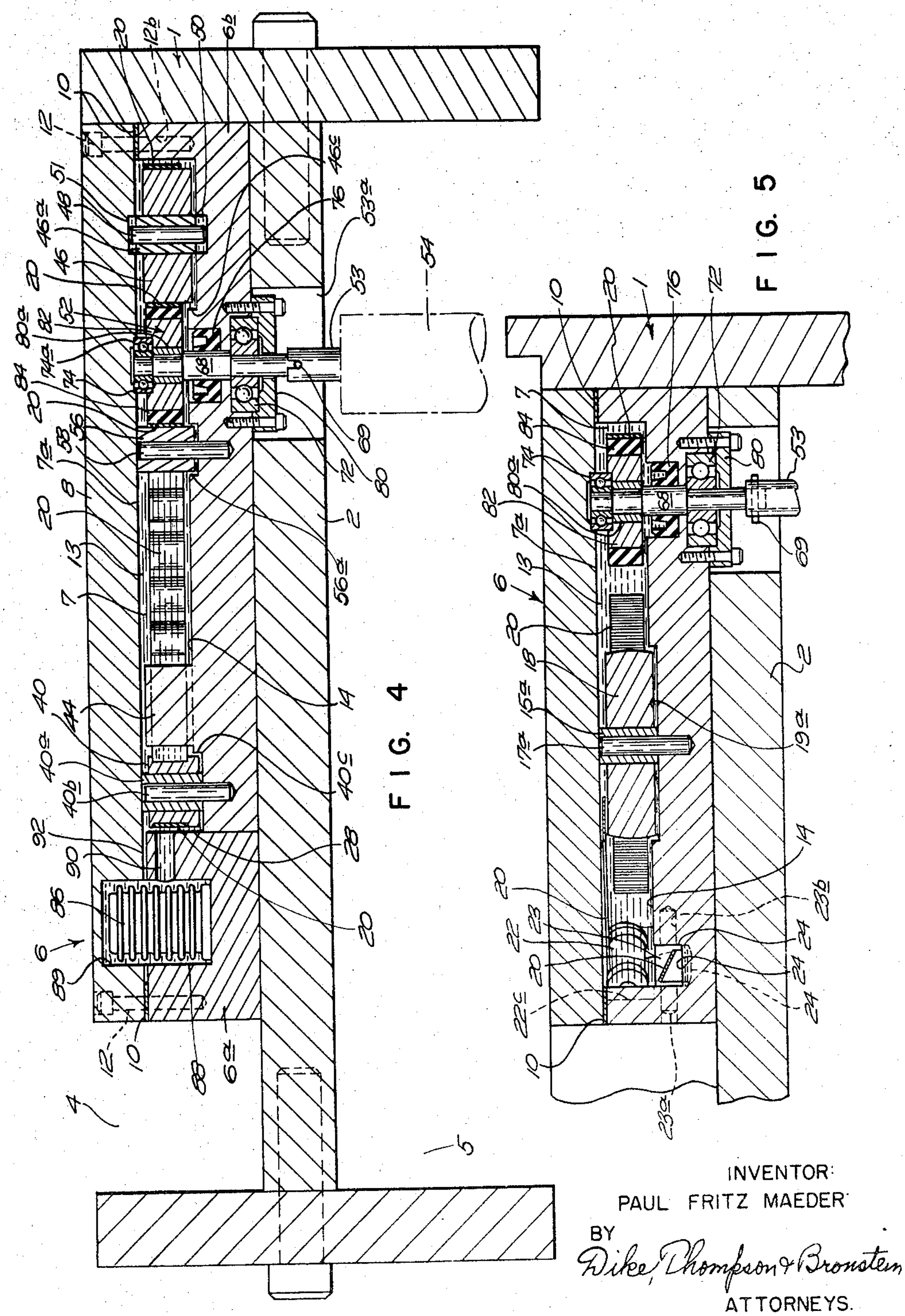
Fig. 4 is a section taken on the line 4—4 of Fig. 1 showing the cavity full of liquid, the cover in place and the supporting structure.
Fig. 5 is a section taken on the line 5—5 of Fig. 1 showing the cavity full of liquid, the cover in place and a part of the supporting structure.

From the trough 42, the tape is pulled around the periphery of nylon tension guide roll 46 (see Figs. 1, 2, 4 and 10) which is rotatably mounted in cavity 7 by means of brass bushing 46*a* and a separable floating pin 48, the bottom of which pin is rotatably and slidably mounted in an elongated slot 50 in the floor of the cavity and the top of which is rotatably and slidably mounted in a corresponding elongated slot 51 in the cover 8. Slots 50 and 51 extend in a direction so that the tension guide roll 46 is free to slidably move toward and away from, and in so doing, into and out of driving relationship with, the rotating drive capstan 52, to be hereafter described (see Fig. 4). The tension of the tape 20 moving around the periphery of tension roll 46 forces the tension roll to the left into driving relationship with the periphery of the rotating drive capstan 52 as shown in Figs. 1, 4 and 10. The bottom of tension roll 46 is received in an elongated oval shaped recess 46*c* in the floor 14 in which recess the roll is adapted to slide when moving into and out of driving relationship with the capstan. When the tension roll is in driving relationship with the capstan it presses the tape 20 firmly against the rotating periphery of the capstan, as shown in Figs. 1, 4 and 10.

After passing around the periphery of the tension guide roll 46, the tape passes between the periphery of the tension guide roll 46 and the periphery of the driving capstan 52 (see Figs. 1, 10 and 4), which is rotatably coupled to the drive coupling 53 (see Figs. 4 and 5) of a motor 54, located below the platform 2. It is this rotating drive capstan which pulls or transports the tape from the inside of the coil, past the heads and around tension roll 46, the tape being held in frictional driving contact with the periphery of the capstan by such tension roll during operation of the device.

The tape passes from between drive capstan 52 and roll 46 partially around the periphery of the drive capstan 52 and then between such periphery and the periphery of the nylon guide roll 56 (see Figs. 1, 2, 4, 6 and 9), rotatably mounted on a pin 58 extending upwardly from the floor of the cavity. The bottom portion of roll 56 is received in a recess 56*a* in the floor 14. The roll 56 is so located with respect to drive capstan 52 that the tape is firmly pressed between the peripheries thereof (see Figs. 4 and 9).

From between 56 and 52, the tape passes through an expansion space 59 formed between the stationary guide member 44 and another stationary guide member 60 (see Figs. 1, 2, 4 and 6) which is also rigidly mounted on the floor 14 of the cavity. From the expansion space 59 the tape passes around the contoured end 62 (Figs. 1–2) of stationary guide member 60 through the funnel shaped space between the contoured end 62 and the flat end portion 38*a* of spring 38, as shown in Fig. 1. The tape then passes around guide roll 63, which is mounted on floor 14 by means of threaded screw 63*a* (see Figs. 1 and 2) and in so doing passes between the periphery of roll 63 and the flat end portion 38*a* of spring 38 (Fig. 1). Roll 63 is so arranged with respect to the spring end 38*a* that the moving layer of tape fits loosely therebetween.

The tape moves from between guide roll 63 and flat end portion 38*a* partially around the periphery of roll 63 and then back to the outside of the spiral multilayer coil 20. It then moves from the outside of the coil to the inside and is again transported along the path set forth above so that the tape follows a continuous path.

As shown in Fig. 1, there is slack in the tape in chamber 59 and it assumes a position similar to that shown. The purpose of the slack is to remove tension on the tape before it is rewound onto the outside of the spiral coil. The contoured end 62 of stationary guide member 60 cooperates with the flat end portion 38*a* of spring 38 and roll 63 (see Figs. 1 and 2) to prevent the transport of a double or folded section (layer) of tape from the expansion space 59 back to the outside of the coil. These parts are so designed that a folded section cannot pass between roll 63 and the end portion 38*a* of spring 38, such folded section being straightened out before the tape passes therebetween.

The close fit between the contoured end 62*a* of member 60 and the periphery of drive capstan 52 serves to peel or scrape the tape off the periphery of the capstan in the event it continues to rotate therewith after it passes from between the capstan and guide roll 56. The close fit between the contoured end portion 66 of stationary guide member 44 and the periphery of guide roll 56 peels or scrapes tape off from such periphery in the event it continues to rotate therewith after passing from between the roll 56 and capstan 52.

The drive capstan 52 comprises a main shaft 68 (see Figs. 1, 2, 4, 5 and 8) having a key 69 (Figs. 4, 5 and 8) at the lower end thereof which is coupled to a clevis type slot in the drive coupling 53 attached to the motor shaft of motor 54. The main shaft 68 extends through an aperture 53*a* in platform 2, through plate 6*b* and the floor of cavity 7 into the cavity itself. It is rotatably mounted on the plate 6*b* and cover 8 by ball bearing assembly 72 in the plate and ball bearing assembly 74 received in recess 74*a* (see Figs. 1, 4 and 5) in the cover 8. It is provided with a liquid seal 76 and the ball bearing assembly 72 is provided with a retaining cap 80 screwed to the bottom of the plate. The portion of the shaft 68 which extends into the cavity 7 has mounted thereon by means of a press fitted bushing assembly 80*a* and 82 a rubber tire or roll 84 which is vulcanized to the periphery of bushing 82 and the periphery of which has a plurality of knife slits 85 therein extending in a direction parallel to the axis of the roll. Although the slits are shown extending all the way through the rubber tire or roll 84, they can extend only part way through.

Normally the rubber roll 84 appears as shown in Figs. 2 and 8. During operation, however, the pressure of the rolls 46 and 56 against the periphery thereof forces the portions of the rubber roll adjacent to rolls 46 and 56 to take on the sawtooth configuration shown in Figs. 9 and 10, which provides traction between the periphery of the rubber roll and the surface of the tape which it contacts and thereby prevents the periphery of the drive capstan from any substantial slipping with respect to the tape in spite of the fact that there is a layer of liquid on the surface of the tape and the periphery of the capstan. Each rubber segment 85*a* is deformed to form a corner or edge 85*c* and wedge shaped spaces 85*b* between the periphery of the rubber roll 84 and the surface of the tape, whereby liquid is removed from the tape surface and escapes through the spaces 85*b* in accordance with the principles of the theory for highly viscous fluids to thereby provide the desired traction and intimate contact between the periphery of roll 84 and the surface of the tape. It is believed that in effect a fluid pressure gradient is set up in a circumferential direction in each space 85*b*, which forces fluid out of the large end of the space and sucks the tape against a portion of the periphery of the segment 85*a* forming a wall of the small end of the space. The same effect is produced on the periphery of the rubber roll wherever it is contacted by tape in substantial tension. Note in the drawings where the peripheral distance between the slashes is more than one-half the depth of the slashes that each passage or space 85*b* is triangular in shape with the tape forming one side of the triangle, the peripheral portion of the segment 85*a* forming a second side of the triangle and the leading, radial, slit side of the next succeeding segment forming the third side. The angle at the leading end of the triangular shaped passage formed by the leading end of the tape and its adjacent side (the peripheral surface of the segment) is substantially smaller than the angle at the trailing end of the triangular shaped passage formed by the trailing end of the tape and its adjacent side (the leading, radial, slit side of the next adjacent segment). The angle at the trailing end is shown as approximately a right angle since the leading, radial, slit side of the next adjacent segment is substantially normal to the tape. Note that with such an arrangement the circumferential flow of liquid in the passages from the small ends to the large ends thereof results in a low pressure at the small end of each passage between the corner 85*c*, forming such small end, and the tape and a greater pressure at the larger end of the next adjacent passage formed by such corner. Note that because of the large angle (approximately 90°) this larger pressure is effective to force the corner 85*c* against the tape. The lower pressure on the other side of the corner (at the small end of the adjacent passage) at the same time causes the corner to be sucked against the tape. This pressure differential causes the corner to be forced with considerable force against the tape to thereby destroy the film between the tape and periphery of the roll. According to well-known principles of fluid flow the suction referred to above in the passages is achieved when the leading angle is less than the minimum angle at which separation of the fluid flow from the sides (the periphery of the rubber segment and the tape) of the passage occurs, which minimum angle is known to be about 20°. See Fluid Mechanics, second edition, by Binder, published in 1949 by Prentice Hall, section 68, pp. 104–107. The phenomenon occurring in the passages is one of highly viscous diffusion, as distinguished from a nozzle phenomenon, because the passage diverges in the direction of fluid flow so that the mean velocity at the large exit end is reduced as compared to the mean velocity at the small entrance end. Such a viscous velocity field will produce a pressure field which possesses a minimum somewhere near the center and has a larger pressure at the exit end. See Binder, section 156, pp. 278–282, especially Equation 260 on page 281, where $\delta$ (delta) is negative, which is the case where the passage diverges as aforesaid. The pressure at the exit is always approximately equal to ambient pressure which is the pressure on the outside of the tape. Since the pressure of the inside of the tape along the passage before the exit is less than the ambient or exit pressure on the outside of the tape, the tape is sucked into the passages against the rubber segments to provide intimate contact between the tape and rubber segments. So long as the fluid flow clings to and is along the sides of the passage efficient suction is provided, but when it separates from the sides, eddies occur and suction is not effectively achieved.

The nozzle phenomenon, which occurs if the passages diverged from the trailing to the leading ends thereof and hence converged from the leading to the trailing ends thereof in the direction of fluid flow rather than vice versa, is described in section 156 on pp. 278–282 of Binder. In such case, the exit pressure at the small exit end of the passage and hence the ambient pressure on the outer surface of the tape would be less than the pressure on the inner surface of the tape in the passage because the mean velocity is highest and hence the pressure is lowest at the small exit end. Consequently, the tape would be forced away from the rubber segments to provide lubrication between the segments and tape due to the build up of a liquid film between the corners of the segments and the tape (see Fig. 211 on page 280 of Binder, Equation 260, and the pressure graph in Fig. 212 where $\delta$ (delta) is positive, which is the case where the passage converges as aforesaid). If the rubber periphery of the drive capstan is smooth, it will not drive the tape through the liquid at sufficient speed.

Figure 12:
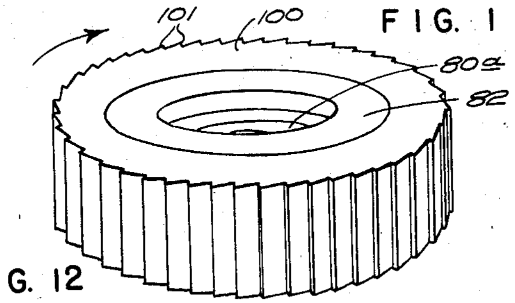
Fig. 12 is a view in perspective of an alternate construction of the drive capstan.

An alternate construction of the capstan roll is shown in Fig. 12 in which a rigid roll 100 made up of metal or some other rigid material is press fitted around the periphery of bushing 82. The periphery of 100 is provided with a plurality of sawtooth serrations 101, as shown, which provide traction between the periphery and the tape surface when roll 100 is rotated in the direction of the arrow. It is obvious that with such a roll the tension and pressure rolls should be made of a yieldable material to prevent the tape from being injured by the saw teeth. It is noted in Figs. 9 and 10 that the shape into which the portions of the rubber periphery of rubber roll 84 adjacent rolls 46 and 56, is forced corresponds to the sawtooth serrations of Fig. 12. It is believed that the same action takes place. Although in the drawings roll 84 is made of rubber, it can be made of any flexible, resilient, elastic, rubber-like material.

A plurality (three) of gas filled bellows 86 (Figs. 1, 2, 3, 4 and 7) are located in recesses 88 in the top surface of plate portion **6*a* to the left of the cavity and heads 32, 34 and 36. The tops of these bellows are received in matching recesses 89 in the cover. A hole 90 provides communication between the cavity 7 and each recess 88** (see Figs. 3, 4 and 7) whereby liquid can flow therebetween. The purpose of these bellows is to provide for expansion of the liquid due to changes in temperature.

When the cover plate 8 is screwed into place on the plates **6*a* and 6*b*, the thickness of gasket 10 provides a small space 92 (Figs. 4 and 7) between the upper surface of plate 6*a* to the left of the cavity and the lower surface of the cover plate 8. This space has a thickness equal to the thickness of the gasket 10**.

Since space 92 and holes 90 provide communication between the recesses 88 and cavity 7, the recesses 88, holes 90 and space 92 as well as the cavity 7 are all filled with liquid **7*a*. Consequently, the entire transport mechanism within the cavity, including rolls 22 and 23, guide rolls 26 and 40, stationary guide members 44 and 60, drive capstan 52, tension roll 46, roll 56 and roll 63, as well as the spiral coil of tape 20, the layer of tape moving from the inside to the outside of the coil, the pair of reels 16 and 18, the bellows 86 and the gap faces of all the heads are all immersed in the liquid 7*a***.

Holes 103 and 104 (Fig. 2) are provided in a side wall of cavity 7. One of the holes is for filling the cavity with liquid and the other for venting the cavity while it is being filled. The cover 8 is first secured to the plate 6 and then liquid is poured into the cavity by means of a tubing and one of the holes until the cavity is filled and liquid pours out of the other vent hole. After the cavity has been filled, plugs 105 (Fig. 1) are used to seal the holes.

It is noted that rolls 22 and 23 are held in the same position regardless of the attitude of the recorder in space. Furthermore, roll 56 extends from the lower surface of top cover 8 to the bottom of recess **56*a* and the bushings 15, 15*a*, 27, 40*a* and 46*a* extend from the lower surface of top 8 to the bottoms of the recesses 19, 19*a*, 26*c*, 40*c* and 46*c* respectively, so that rolls 56, 16, 18, 26, 40 and 46 are held between the top 8 and the bottoms of their respective recesses in substantially the same position regardless of the attitude of the recorder in space. Note also that pin 48 extends from the top surface of slot 51 to the bottom surface of slot 50 and that pins 17, 17*a*, 29, 40*b* and 58 are anchored to floor 14. It is apparent that the vertical position of capstan 52 cannot change. Roll 63 and stationary guide members 30, 44, and 60** are fixed to the floor of the cavity and the heads are fixed in the plate.

Consequently, these units are not affected by a change in attitude. The tops of these stationary units are too close to the top 8 to permit the tape to deviate from its guided path regardless of the attitude of the recorder. Furthermore, since the tape is in substantially neutral suspension in the liquid it is not affected by a change in attitude. Consequently, the recorder can operate efficiently in any attitude or position in space which makes it practical for use in missiles and other airborne equipment.

The cartridge 6 is small enough to be held in the palm of one hand, the particular cartridge shown in the drawings being 6 inches long, 4 inches wide and 1⅛ inches inch. Consequently, it is compact and economical to manufacture and can be used in situations where portability and compactness are of importance.

The tape is made from a polyester sold by E. I. du Pont de Nemours & Company under the trademark "Mylar." It, plus its applied coatings has a mean specific gravity of 1.76. The liquid **7*a* is a mixture of Fluorochemicals FC75 and heptane and has substantially the same specific gravity as the tape. All the guide rolls and the reels are made of nylon. The floating pin 48 on which the tension guide roll 46 is mounted is made of steel. The stationary guides 30, 44 and 60 may be made of a rigid plastic material and attached to the floor by screws or may be made of metal and integral with the plate 6**.

Roll 63 can be omitted and the contoured end portion 62 of stationary guide 60 designed so as to guide the tape back to the outside of the coil. Furthermore, stationary guides can be inserted between reels 16 and 18 to aid in retaining the coil in the correct shape and in guiding the inner coil or layer of tape away from the inside of the coil, partially around the periphery of reel 16 and over the reel 18 and the top of the coil as it is pulled from the coil over roll 22. The elongated end **38*a* of spring 38 can be replaced by a layer of felt glued to the rear face of bar 30. The peripheries of rolls 52 and 56 may each have a circumferential groove therein into which extends a finger forming a part of the contoured end 62*a* in the case of roll 52 and a part of the contoured end 66 in the case of roll 56. This arrangement guarantees that the tape cannot wrap around the rolls 52 and 56**.

The only parts of the transport mechanism which have one degree or more of freedom of translatory motion, i.e., freedom of translatory motion in one or more directions, in this unit are the tape and the tension guide roll assembly, including the nylon roll 46, metal bushing **46*a* and the floating pin 48**. Consequently, the dimensions of these parts of the tension guide roll assembly are selected so that the mean specific gravity of the assembly is substantially the same or reasonably close to the specific gravity of the liquid. However, the mean specific gravity of all the rotatable guide rolls can be made substantially equal or reasonably close to the specific gravity of the liquid.

In effect, since the specific gravity of the liquid is substantially the same as the specific gravity of the tape and the mean specific gravity of the tension roll assembly the tape and tension roll assembly are in substantially neutral suspension in the liquid.

The electronic units **97*a* are mounted on a platform 98 (see Fig. 3) below platform 2 and they are connected with the heads of the recorder by leads 99**. Since the electronic units do not form a part of the present invention, they are not described herein. The recorder shown in the drawings and described herein operated efficiently at 75 *g*'s for a substantial length of time. The present invention includes within its scope any device for recording and/or playing back or reproducing intelligence by means of a tape of some kind, the word tape being intended to include a recorder tape as such, photographic film and any other kind of strip material of any cross sectional dimension such as wire, including a woven material, and flexible ceramic materials, etc., on which the intelligence can be recorded. This includes photographic and optical equipment of all kinds using strips of film.

The immersion of the various mechanical parts of the recorder in the liquid not only reduces the inertia forces on the parts but also protects the parts against external vibrations.

In Fig. 2, because parts have been removed from the cavity, the liquid level *7a* has dropped, as shown, slightly lower than the top of plates 6 and 6a.

Although the present invention is particularly adapted for use in devices for recording intelligence by means of a tape, it is also adapted to be used in other apparatus in which it is desired to reduce inertia forces on, and vibration of, a transportable part such as a lever or a part having translatory motion. An example of such an apparatus is a potentiometer in which the parts are immersed in liquid.

I claim:

1. In a mechanism for recording intelligence by means of a tape and in which intimate contact between the tape and a surface is required, means for placing said tape under tension over and against said surface, means located on said surface providing a fluid flow working passage between said tape and said surface at least when said tape is being moved longitudinally under tension, one side of said passage being formed by said tape, the leading end of said one side, with respect to said longitudinal movement of said tape, forming with another side of the passage adjacent to said leading end a first angle, the trailing end of said one side, with respect to said longitudinal movement of said tape, forming with another side of said passage adjacent said trailing end a second angle which is substantially larger than said first angle, whereby said passage diverges in the direction from the leading end to the trailing end thereof, the tangential component of the force exerted on the tape by said surface being in a direction generally from the trailing to the leading ends of said passage, said movement of said tape causing fluid to flow from said leading end to said trailing end of said passage, said first angle being less than the minimum angle at which separation of said fluid flow from the sides of said passage occurs, whereby said flow of fluid through said passage from the leading end thereof to the trailing end thereof creates a suction on said tape.

2. A mechanism according to claim 1, said angle at the trailing end of said passage being approximately a right angle.

3. A mechanism according to claim 1, said surface and at least the portion of said tape contacting said surface being located in a liquid-proof chamber.

4. A mechanism according to claim 1, at least the portions of said tape and said surface which contact each other being immersed in a liquid.

5. A mechanism according to claim 1, said means providing said fluid flow passage comprising means providing a plurality of said passages between said tape and said surface, said passages being triangular in shape, said one side of each of said passages comprising a side of the triangle.

6. In a mechanism for recording intelligence by means of a tape and in which intimate contact between the tape and a surface is required, means for placing said tape under tension over and against said surface, said surface being resilient, flexible and yieldable and having slits therein extending in a direction at an angle to the longitudinal center line of said tape, said surface being adapted to be deformed in response to longitudinal movement of said tape under tension and in contact with said surface to provide triangular shaped fluid flow working passages between said tape and said surface, one side of each of said passages being formed by the tape, the leading end of said one side, with respect to said longitudinal movement of said tape, forming with another side of said passage adjacent to said leading end a first angle at the leading end of said passage, the trailing end of said one side, with respect to said longitudinal movement of said tape, forming with another side of said passage adjacent said trailing end a second angle at the trailing end of said passage which is substantially larger than said first angle, whereby said passage diverges in the direction from the leading end thereof to the trailing end thereof and fluid is forced to flow from the leading end of said passage to the trailing end thereof in response to said longitudinal movement of said tape, the tangential component of the force exerted on the tape by said surface being in a direction generally from the trailing to the leading ends of said passage, said angle at said leading end of said passage being less than the minimum angle at which separation of said fluid flow from the sides of said passage occurs, whereby said flow of said fluid through said passage from the leading end thereof to the trailing end thereof creates a suction on said tape.

7. In a transport mechanism for driving a tape, a driving mechanism comprising a drive capstan, means spaced around the periphery of said capstan for wrapping said tape under tension over a substantial portion of said periphery, means, located on said periphery, for providing a working passage between said tape and said portion of said periphery at least during longitudinal movement of said tape under said tension, and for forcing fluid trapped between said portion of said periphery and said tape to flow through said working passage in a circumferential direction opposite from the direction of movement of said tape and out from between said tape and said portion of said periphery during longitudinal movement of said tape under said tension, one side of said passage comprising said tape, the leading end of said one side, with respect to said longitudinal movement of said tape, forming with another side of said passage adjacent to said leading end a first angle and the trailing end of said one side, with respect to said longitudinal movement of said tape, forming with another side of said passage adjacent to said trailing end a second angle which is substantially larger than said first angle, whereby said passage diverges in the direction from the leading to the trailing ends thereof, said first angle being less than the minimum angle at which separation of said fluid flow from the sides of said passage occurs, whereby said flow of said fluid through said passage from the leading end thereof to the trailing end thereof creates a suction on said tape.

8. In a transport mechanism according to claim 7, the periphery of said capstan being resilient, flexible and yieldable and having a plurality of slits therein extending in a direction at an angle to the longitudinal center line of said tape, said slits dividing said periphery into segments, said passage being formed by deformation of said segments, said means for placing said tape under tension over and against a substantial portion of said periphery, comprising a tension roll having a longitudinal axis substantially parallel to the axis of said capstan and movable toward and away from said capstan, said tape being adapted to be wrapped around a substantial portion of the periphery of said tension roll to urge said tension roll toward said periphery of said capstan in response to turning movement of said capstan and longitudinal movement of said tape to squeeze the tape between the peripheries of said tension roll and said capstan and a pressure roll having a longitudinal axis substantially parallel to said capstan and located adjacent the periphery of said capstan a substantial distance along said capstan periphery from said tension roll, said tape being adapted to be squeezed between said capstan and said pressure roll and to be wrapped under tension around a substantial portion of said capstan periphery between said tension and pressure rolls by said tension and pressure rolls.

9. A mechanism according to claim 8, the initial movement of said tape being provided by the intimate contact with said capstan periphery of the tape portion squeezed between said pressure roll and said capstan peripheries, said initial movement causing said tension roll to be moved toward said capstan periphery to a position in which it squeezes said tape against the capstan periphery, the continued movement of said tape maintaining said tension roll in said position.

10. A mechanism according to claim 8, wherein at least the portions of said capstan, said tape, said pressure roll and said tension roll which are in contact with each other are immersed in a liquid.

11. A mechanism according to claim 8, said segments being adapted to be deformed in response to longitudinal movement of said tape to form triangular shaped fluid flow passages between said tape and capstan periphery.

12. A mechanism according to claim 8, said adjacent side forming said angle at the leading end of the passage comprising the periphery of a segment, said adjacent side forming said angle at the trailing end of the passage comprising the leading, slit side of the next adjacent segment, said leading, slit side extending approximately normal to said tape.

13. A mechanism according to claim 8, said axes of said capstan, pressure roll and tension roll lying in a substantially straight line, the tape being adapted to be wrapped under tension around substantially half of the capstan periphery by said tension and pressure rolls.

14. In a transport mechanism according to claim 7, said means for placing said tape under tension over and against a substantial portion of the periphery of said capstan comprising a tension roll movable away from and toward said periphery, said tape being adapted to be wrapped around a substantial portion of said tension roll to urge it toward said capstan periphery in response to movement of said tape to squeeze the tape between said tension roll and said capstan periphery and means, located a substantial distance around said capstan periphery from said tension roll, for cooperating with said tension roll to place said tape under tension over and against the portion of the capstan periphery therebetween.

References Cited in the file of this patent

UNITED STATES PATENTS

| | | |
|---|---|---|
| 2,197,662 | Hughes | Apr. 16, 1940 |
| 2,240,542 | Bourdon | May 6, 1941 |
| 2,746,749 | Huck | May 22, 1956 |
| 2,755,086 | Lubersky | July 17, 1956 |
| 2,831,678 | MacNeill | Apr. 22, 1958 |
| 2,848,221 | Camras | Aug. 19, 1958 |
| 2,871,502 | Whisnant | Feb. 3, 1959 |